US008711079B2

(12) United States Patent
Lee et al.

(10) Patent No.: US 8,711,079 B2
(45) Date of Patent: Apr. 29, 2014

(54) DATA DRIVER AND LIQUID CRYSTAL DISPLAY DEVICE USING THE SAME

(71) Applicant: Samsung Display Co., Ltd., Yongin (KR)

(72) Inventors: Jae-Han Lee, Hwaseong-si (KR); Sunkyu Son, Suwon-si (KR); Myong-Bin Lim, Seoul (KR); Inyong Hwang, Gyeonggi-do (KR); OckJin Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/840,205

(22) Filed: Mar. 15, 2013

(65) Prior Publication Data

US 2013/0207958 A1 Aug. 15, 2013

Related U.S. Application Data

(62) Division of application No. 11/952,862, filed on Dec. 7, 2007, now Pat. No. 8,416,176.

(30) Foreign Application Priority Data

Dec. 11, 2006 (KR) ........................ 10-2006-0125336

(51) Int. Cl.
*G09G 3/36* (2006.01)
*G09G 3/34* (2006.01)
*G06F 3/038* (2013.01)

(52) U.S. Cl.
USPC ............... 345/100; 345/89; 345/94; 345/204; 345/212

(58) Field of Classification Search
CPC ............. G09G 3/00; G09G 3/20; G09G 3/34; G09G 3/36
USPC ......... 345/30, 55, 84, 87, 94, 96, 98, 89, 100, 345/204, 211–214
See application file for complete search history.

(56) References Cited

U.S. PATENT DOCUMENTS

| | | | | |
|---|---|---|---|---|
| 6,573,881 | B1 | 6/2003 | Kwon | |
| 2004/0263466 | A1 | 12/2004 | Song et al. | |
| 2005/0219195 | A1 * | 10/2005 | Yano et al. | 345/100 |
| 2006/0001630 | A1 * | 1/2006 | Chen et al. | 345/96 |
| 2008/0278427 | A1 * | 11/2008 | Jang et al. | 345/98 |

FOREIGN PATENT DOCUMENTS

| | | |
|---|---|---|
| JP | 2004-258485 | 9/2004 |
| JP | 2005-208551 | 8/2005 |
| KR | 2005-0002428 | 1/2005 |
| KR | 10-2006-0044817 | 5/2006 |

* cited by examiner

*Primary Examiner* — Lun-Yi Lao
*Assistant Examiner* — Jarurat Suteerawongsa
(74) *Attorney, Agent, or Firm* — Innovation Counsel LLP

(57) ABSTRACT

A liquid crystal display having data driving apparatus comprising first and second output switches, a charge sharing line, and first and second charge sharing switches. The first output switch switches an electrical connection between a first amplifier providing a positive gradation voltage and a first data line in response to a control signal. The second output switch switches an electrical connection between a second amplifier providing a negative gradation voltage and a second data line in response to the control signal. The first charge sharing switch switches an electrical connection between the first data line and the charge sharing line in response to the control signal. The second charge sharing switch switches an electrical connection between the second data line and the charge sharing line in response to the control signal.

8 Claims, 9 Drawing Sheets

DATA DRIVER AND LIQUID CRYSTAL DISPLAY DEVICE USING THE SAME

CROSS-REFERENCE TO RELATED APPLICATION(S)

This application is a Divisional Application of U.S. patent application Ser. No. 11/952,862 filed on Dec. 7, 2007, which claims priority from Korean Patent Application No. 10-2006-0125336 filed in the Korean Patent Office on Dec. 11, 2006, the entire contents of which are incorporated by reference herein.

BACKGROUND OF THE INVENTION

1. Field of the Invention

The present invention relates to a liquid crystal display ("LCD") device and, more particularly, to an LCD having a data driver that performs a charge sharing function.

2. Discussion of the Related Art

An LCD device includes a thin film transistor ("TFT") substrate and a color filter substrate on which electric field generating electrodes are formed. A liquid crystal is injected between the two substrates arranged to face each other. The LCD device displays an image by varying the light transmittance of the liquid crystal in accordance with an electric field applied between the electrodes that changes the orientation of the liquid crystal molecules when a voltage is applied to the electrodes.

An LCD panel comprises a plurality of pixels provided at the intersections of the data lines and gate lines, a data driving unit for applying a data signal to the data line, a gate driving unit for applying a gate driving signal to the gate line, a timing controller for controlling the data and gate driving units, and a power supply unit for supplying a driving voltage to the LCD panel.

The LCD device is driven in an alternating current ("AC") signal applying method that applies electric fields to adjacent pixels in a direction different from each other in order to prevent polarization of the liquid crystal and to improve display performance.

Methods of applying AC signals to the pixels includes a dot inversion method that drives the liquid crystal panel by inverting the polarities of voltages applied to adjacent dots, a line inversion method that inverts the polarities of voltages applied to adjacent gate lines, a column inversion method that inverts the polarities of voltages applied to adjacent data lines, a frame inversion method that inverts the polarities of voltages applied to all the pixels once per frame time, and the like.

In the related art charges may be shared among respective data lines by shorting the data lines connected to a data driving unit before the gradation voltage corresponding to the display data is applied to the data lines. However, when the respective data lines are shorted, the charge share level between the first and last data lines is different from that of a data line positioned in the middle. This is because the first and last data lines perform the charge sharing with an adjacent data line unlike the data line located in the middle.

The difference in the charge share level causes a difference in the amount of pixel charge and, results in a vertical line defect when the LCD panel is driven by a plurality of data driving integrated circuits.

SUMMARY OF THE INVENTION

The present invention provides an LCD device a having a data driver that performs a charge sharing function for data lines connected to first and last channels of a data driving integrated circuit.

According to an aspect of the present invention a data driving apparatus for an LCD device comprises: a first output switch switching an electrical connection between a first amplifier providing a positive gradation voltage and a first data line in response to a control signal; a second output switch switching an electrical connection between a second amplifier providing a negative gradation voltage and a second data line in response to the control signal; a charge sharing line sharing electric charges of the first and second data lines; a first charge sharing switch switching an electrical connection between the first data line and the charge sharing line in response to the control signal; and a second charge sharing switch switching an electrical connection between the second data line and the charge sharing line in response to the control signal.

According to another aspect, the present invention provides a data driving apparatus for an LCD including: a first output switch switching an electrical connection between a first amplifier providing a positive gradation voltage and a first data line in response to a control signal; a second output switch switching an electrical connection between a second amplifier providing a negative gradation voltage and a second data line in response to the control signal; and a charge sharing switch switching an electrical connection between the first and second data lines in response to the control signal.

In still another aspect, the present invention provides a data driving apparatus for an LCD device including: an output switch switching electrical connections between a plurality of amplifiers for providing a gradation voltage and a plurality of data lines corresponding to the amplifiers and provided with the gradation voltage, respectively; a first charge sharing line sharing electric charges of the plurality of data lines; a second charge sharing line sharing electric charges between data lines connected to first and last amplifiers in the plurality of amplifiers; and a charge sharing switch switching electrical connections between the first charge sharing line and the plurality of data lines and electrical connections between the second charge sharing line and the data lines connected to the first and last amplifiers in the plurality of amplifiers, respectively, in response to a control signal.

In a further aspect, the present invention provides a liquid crystal display device including: a liquid crystal display panel displaying data by a gradation voltage provided in response to a gate driving signal; a data driving unit generating the gradation voltage based on a gamma voltage and providing the same to the liquid crystal display panel in response to a data control signal; a gate driving unit providing the gate driving signal to the liquid crystal display panel in response to a gate control signal; and a timing controller providing the data control signal and the gate control signal, wherein the data driving unit comprises a plurality of data driving integrated circuits and each of the plurality of data driving integrated circuits comprises a first amplifier providing a positive gradation voltage, a second amplifier corresponding to the first amplifier to provide a negative gradation voltage, and a switch unit sharing electric charges by electrically connecting a first data line connected to the first amplifier and a second data line connected to the second amplifier before the positive and negative gradation voltages are applied, respectively.

In a still further aspect, the present invention provides a liquid crystal display device including: a liquid crystal display panel displaying data by a gradation voltage provided in response to a gate driving signal; a data driving unit generating the gradation voltage based on a gamma voltage and providing the same to the liquid crystal display panel in response to a data control signal, the data driving unit comprising a plurality of data driving integrated circuits; a gate driving unit providing the gate driving signal to the liquid crystal display panel in response to a gate control signal; and a timing controller providing the data control signal and the gate control signal, wherein each of the plurality of data driving integrated circuits comprises an output switch switching electrical connections between a plurality of amplifiers providing the gradation voltage and a plurality of data lines corresponding to the amplifiers and supplied with the gradation voltage, a first charge sharing line sharing electric charges of the plurality of data lines, a second charge sharing line sharing electric charges between data lines connected to first and last amplifiers in the plurality of amplifiers, and a charge sharing switch switching electrical connections between the first charge sharing line and the plurality of data lines and electrical connections between the second charge sharing line and the data lines connected to the first and last amplifiers in the plurality of amplifiers, respectively, in response to the control signal.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made to the exemplary embodiments of the present invention, examples of which are illustrated in the accompanying drawings. Wherever possible, the same reference numbers will be used throughout the drawings to refer to the same or like parts.

Figure 1:
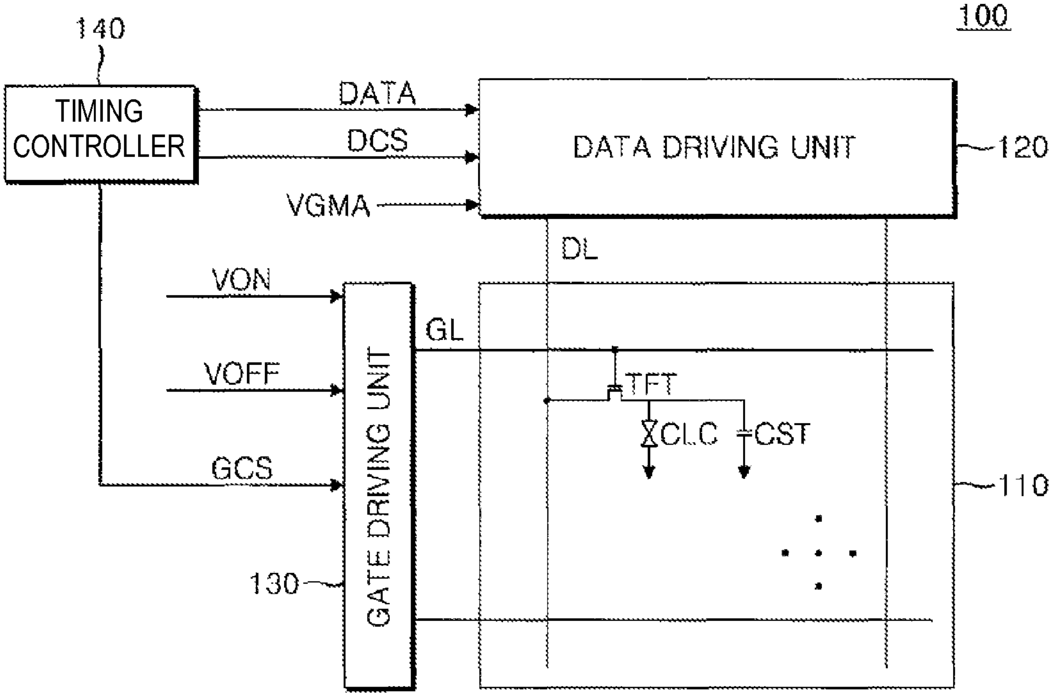
FIG. 1 is a block diagram of an LCD device according to an exemplary embodiment of the present invention.

FIG. 1 is a block diagram of an LCD device according to an exemplary embodiment of the present invention. As shown in the figure, an LCD device according to an exemplary embodiment of the present invention includes a liquid crystal panel 110, a data driving unit 120, a gate driving unit 130, and a timing controller 140.

The liquid crystal panel 110 includes a color filter substrate provided with a color filter and a common electrode, a TFT substrate provided with a plurality of TFTs and a plurality of pixel electrodes, and a liquid crystal disposed between the color filter substrate and the TFT substrate.

The TFT substrate includes a pixel capacitance CLC representing display data DATA at an intersection between a gate line GL and a data line DL, a TFT applying a voltage corresponding to the display data DATA to the pixel capacitance CLC in response to a gate driving signal, and a storage capacitance CST maintaining the voltage corresponding to the display data DATA applied to the pixel capacitance CLC for one frame period.

The TFT includes a gate connected to the gate line GL, a source connected to the data line DL, and a drain connected to the pixel electrode of the pixel capacitance CLC. The liquid crystal rotates in response to an electric field generated between the common electrode formed on the color filter substrate and the pixel electrode provided on the TFT substrate, thereby displaying a gray scale corresponding to the display data DATA.

The data driving unit 120 generates an analog voltage corresponding to the display data DATA using a gamma voltage VGMA, and applies the same to the TFT, thus displaying the display data DATA in the unit of a gate line GL.

For this, the data driving unit 120 is supplied with a data control signal DCS and display data DATA from the timing controller 140 and receives a gamma voltage VGMA from a gamma voltage generating unit (not shown in the drawing). In this case, the data control signal DCS includes a data start pulse STH, a data sync clock CPH, a load signal TP, and a polarity inversion signal POL.

The data driving unit 120 implemented with a plurality of data driving integrated circuits may be attached to the liquid crystal panel 110 in a tape carrier package ("TCP") type, or loaded on the TFT substrate of the liquid crystal panel 110 in a chip on glass ("COG") type.

The gate driving unit 130 simultaneously turns on a plurality of TFTs connected to the gate lines GL selected by applying a gate driving signal to a plurality of gate lines GL sequentially. For this, the gate driving unit 130 is supplied with a gate control signal GCS from the timing controller 140 and receives a gate-on voltage VON and a gate-off voltage VOFF used as gate driving signals from a power supply unit (not shown in the drawing). In this case, the gate control signal GCS includes a gate start pulse STV and a gate sync clock CPV.

The gate driving unit 130 implemented with a plurality of gate driving integrated circuits may be attached to the TFT substrate of the liquid crystal panel 110 in a TCP type. Alternatively, the gate driving unit 130 may be formed by being integrated in an amorphous silicon gate ("ASG") type when the TFTs are provided on a non-display area of the TFT substrate.

The timing controller 150 converts display data DATA input from the outside to the display data DATA capable of being processed by the data driving unit 120 and then supplies the converted display data DATA to the data driving unit 120. Moreover, the timing controller 150 supplies control signals GCS and DCS required for the operations of the data driving unit 120 and the gate driving unit 130, to the driving units 120 and 130, respectively.

Figure 2:
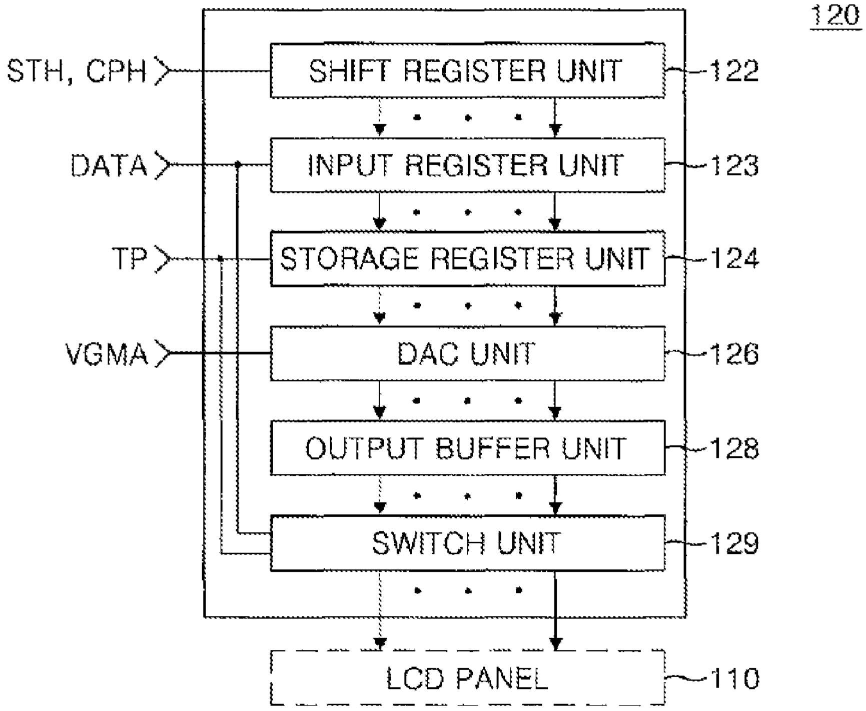
FIG. 2 is a block diagram of a data driving unit in the LCD device shown in FIG. 1.

FIG. 2 is a block diagram of a data driving unit in the LCD device shown in FIG. 1. As shown in the figure, the data driving unit 120 according to an exemplary embodiment of the present invention includes a shift register unit 122, an input register unit 123, and a storage register unit 124, a digital/analog converting ("DAC") unit 126, an output buffer unit 128, and a switch unit 129.

The shift register unit 122 is supplied with a data start signal STH and a data sync clock CPH to generate a sampling signal and provides the sampling signal to the input register 124. In particular, the shift register unit 122 generates n number of sampling signals by shifting the data start signal STH at each cycle of the data sync clock CPH. For this, the shift register unit 122 includes n number of shift registers, in which 'n' is preferably the number of pixel capacitances connected to one gate line.

The input register unit 123 sequentially stores display data DATA in response to the sampling signals that are sequentially inputted from the shift register unit 122. In particular, the input register unit 123 stores display data DATA corresponding to a portion of a line in response to the sampling signals. For this, the input register unit 123 includes data input latches for latching and storing the n number of data corresponding to the portion of a line.

If a load signal TP is input, the storage register unit 124 simultaneously receives the display data DATA of the portion of a line stored in the input register unit 123, and stores the received display data DATA. For this purpose, the storage register unit 124 includes data storage latches in the same number as the data input latches of the input register unit 123. In this case, the load signal TP plays a role in applying an analog voltage corresponding to the display data DATA of the portion of a line to the pixel capacitances of the pixels connected to one gate line at the same time.

The DAC unit 126 generates a gradation voltage corresponding to the display data DATA using a gamma voltage VGMA and then provides the same to the output buffer unit 128. The gradation voltage is an analog voltage corresponding to a gradation of the display data DATA.

The output buffer unit 128 includes a plurality of amplifiers (not shown in the drawing) amplifying the analog voltage supplied from the digital/analog converting unit 128 and then providing the same to the data lines. In this case, the amplifier is preferably a voltage follower.

The switch unit 129, provided between the liquid crystal panel 110 and the output buffer unit 128, switches an output of the output buffer unit 128 in response to the load signal TP and pre-charges the data lines by charge sharing.

In the present embodiment, the switch unit 129 has been described as being included in the data driving unit 120; however, the present invention is not limited thereto. The switch unit 129 may be integrated on the TFT substrate of the liquid crystal panel.

The switch unit 129 connected between the liquid crystal panel 110 and the output buffer unit 128 will be described in more detail as follows.

Figure 3:
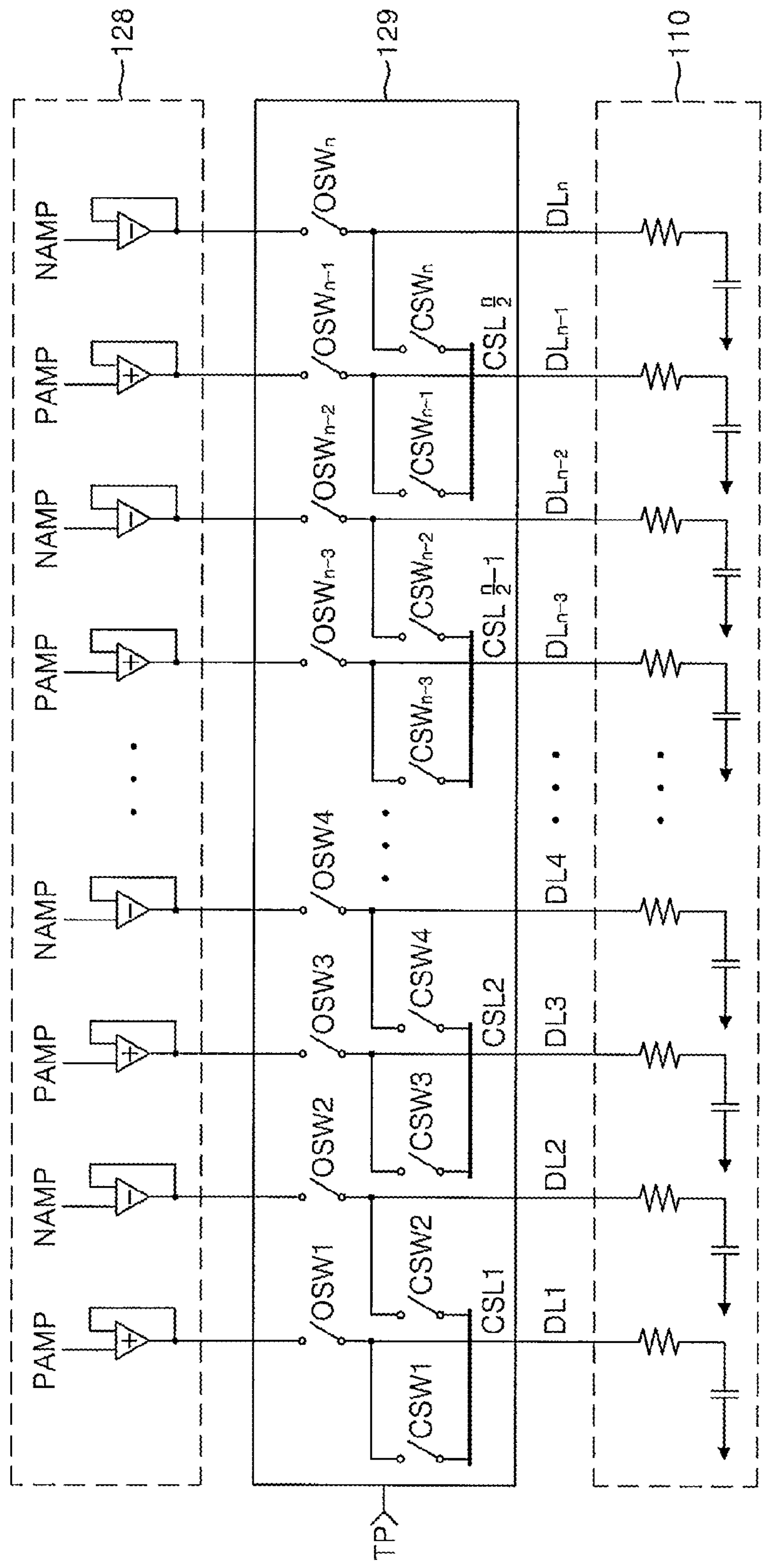
FIG. 3 is a conceptual diagram of a switching unit shown in FIG. 2.

FIG. 3 is a conceptual diagram of the switching unit shown in FIG. 2. As shown in the figure, the output buffer unit 128 includes a plurality of amplifiers outputting polarity gradation voltages to corresponding data lines, respectively. The amplifiers output the gradation voltages with a positive or negative polarity in response to a polarity inversion signal POL.

The output buffer unit 128 of the present embodiment is provided to perform dot inversion, in which odd-numbered amplifiers output a positive gradation voltage and even-numbered amplifiers output a negative gradation voltage. For convenience of explanation, the amplifier outputting the positive gradation voltage will be referred to as a positive amplifier PAMP and the amplifier outputting the negative gradation voltage will be referred to as a negative amplifier NAMP.

The switch unit 129 includes a plurality of output switches OSW1 to OSWn, a plurality of charge sharing switches CSW1 to CSWn, and a plurality of charge sharing lines CSL1 to CSLn/2. The plurality of output switches OSW1 to OSWn are provided between the amplifiers and the data lines DL1 to DLn corresponding to the amplifiers, respectively, and switch electrical connections between amplifier output terminals and the data lines DL1 to DLn, respectively. The charge sharing switches CSW1 to CSWn are provided between the data lines DL1 to DLn and the corresponding charge sharing lines CSL1 to CSLn/2, respectively, and switch electrical connections between the data lines DL1 to DLn and the charge sharing lines CSL1 and CSLn/2 in response to the load signal TP.

The charge sharing lines CS1 and CSLn/2 electrically connects the data lines DL1 , DL3, . . . , and DLn−1 connected to the positive amplifiers PAMP and the data lines DL2, DL4, . . . , and DLn connected to the negative amplifiers NAMP, thereby enabling electric charges to be shared by each pair of the data line DL1:DL2, DL3:DL4, . . . , and DLn−1:DLn. In more detail, the switch unit 129 of the present embodiment includes a charge sharing line CSL1 to CSLn/2 in the unit of a pair of data lines DL1:DL2, DL3:DL4, . . . , and DLn−1:DLn. In this case, the pair of the data lines DL1:DL2, DL3:DL4, . . . , and DLn−1:DLn includes one of the data lines DL1, DL3, . . . , and DLn−1 connected to the positive amplifiers PAMP and one of the data lines DL2, DL4, . . . , and DLn connected to the negative amplifiers NAMP.

In the present embodiment, the charge sharing switches CSW1 to CSLn are provided on the data lines DL1, DL3, . . . , and DLn−1 supplied with the positive gradation voltage and the data lines DL2, DL4, . . . , and DLn supplied with the negative gradation voltage, respectively. The respective data lines DL1 to DLn may be connected to the charge sharing lines CSL1 to CSLn/2 via the charge sharing switches CSW1 to CSWn.

In response to the load signal TP, if the output switches OSW1 to OSWn are opened and if the charge sharing switches CSW1 to CSWn are shorted, charge sharing takes place in the unit of a pair of data lines DL1:DL2, DL3:DL4, . . . , and DLn−1:DLn via the charge sharing lines CSL1 to CSLn/2, respectively. In this case, each pair of the data lines DL1:DL2, DL3:DL4, . . . , and DLn−1:DLn denotes one data line connected to one positive amplifier and one data line connected to one negative amplifier.

Accordingly, the LCD device according to the exemplary embodiment of the present invention can solve the problem of irregular charge sharing occurring in the first and last data lines in the related art data driving integrated circuit and eliminate the vertical line defect caused by irregular charge sharing.

Figure 4:
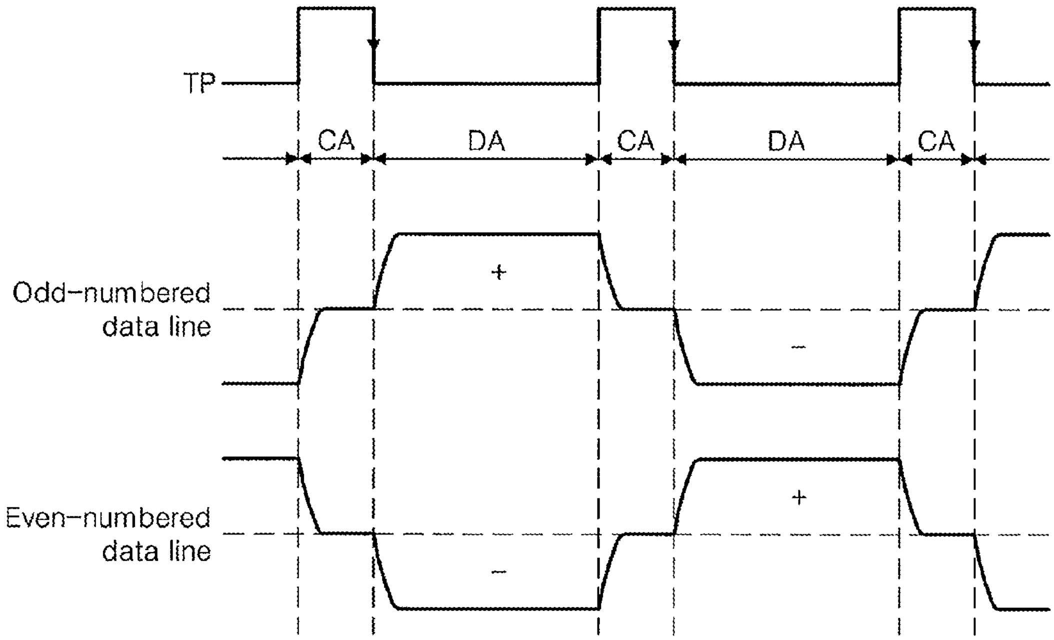
FIG. 4 is a timing diagram illustrating an operation of the switching unit shown in FIG. 3.

FIG. 4 is a timing diagram illustrating an operation of the switching unit shown in FIG. 3. As shown in the figure, the load signal TP includes a plurality of high and low level areas. The high level area corresponds to a charge sharing area CA where charge sharing takes place, and the low level area corresponds to a driving area DA where a gradation voltage is applied to the data line.

When the load signal TP is at a high level, the output switches OSW1 to OSWn are opened and the charge sharing switches CSW1 to CSWn are shorted. So, charge sharing takes place in the unit of a pair of data lines via the corresponding charge sharing lines CSL1 to CSLn/2.

Subsequently, at the point of time when the load signal TP falls from a high level to a low level, the positive amplifier PAMP of the output buffer unit 128 outputs a positive gradation voltage to the odd-numbered data lines DL1, DL3, . . . , and DLn−1 and the negative amplifier NAMP outputs a negative gradation voltage to the even-numbered data lines DL2, DL4, . . . , and DLn.

In the driving area DA where the load signal TP is in the low level area, the output switches OSW1 to OSWn are shorted and the charge sharing switches CSW1 to CSWn are opened.

Accordingly, the gradation voltage having a positive or negative polarity is provided to each of the data lines DL1 to DLn.

After the gradation voltages of the portion of a line have been supplied to the data lines DL1 to DLn, charge sharing takes place again as the load signal TP is shifted to a high level state, and the gradation voltages are repeatedly applied to the data lines DL1 to DLn as the load signal TP is shifted to a low level state.

The charge sharing occurs in pairs of data lines DL1:DL2, DL3:DL4, . . . , and DLn−1:DLn via the respective charge sharing lines CSL1 to CSLn/2, in which the data lines DL1, DL3, . . . , and DLn−1 are provided with the positive gradation voltage and the data lines DL2, DL4, . . . , and DLn are applied with the negative gradation.

Figure 5:
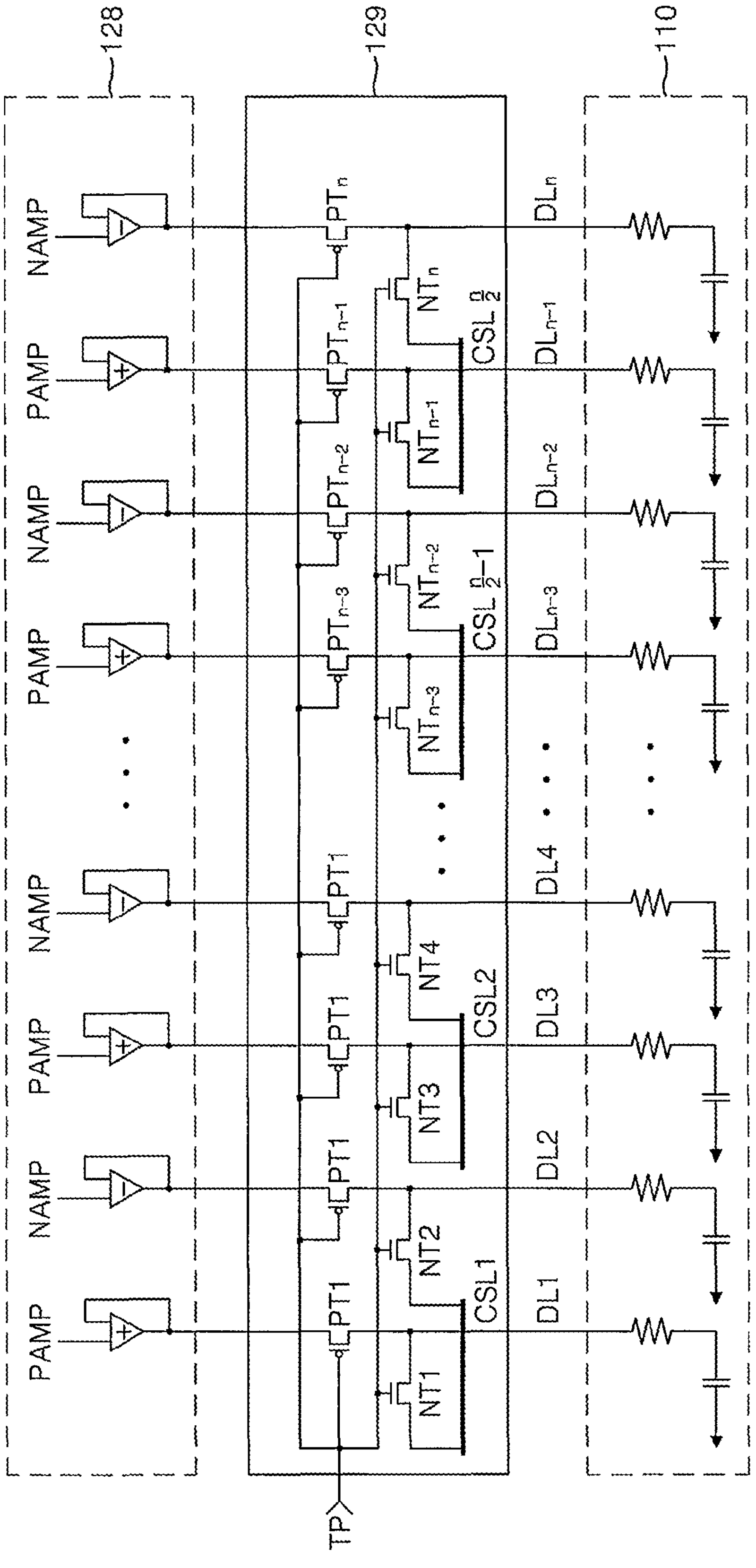
FIG. 5 is an exemplary circuit diagram of the switching unit shown in FIG. 3.

FIG. 5 is an exemplary circuit diagram of the switching unit shown in FIG. 3. As shown in the figure, the switch unit 129 includes an output switch OSW including PMOS transistors PT1 to PTn, a charge sharing switch CSW including NMOS transistors NT1 to NTn, and a plurality of charge sharing lines CSL1 to CSLn/2.

Each of the PMOS transistors PT1 to PTn constituting the output switch OSW includes a source connected to an amplifier output terminal, a drain connected to a data line, and a gate supplied with a load signal TP. Accordingly, the output switch OSW is opened in a charge sharing area where the load signal TP is at a high level and shorted in a driving area where the load signal TP is at a low level.

Each of the NMOS transistors NT1 to NTn constituting the charge sharing switch CSW includes a drain connected to a data line, a source connected to a charge sharing line CSL, and a gate supplied with the load signal TP. Accordingly, the charge sharing switch CSW is shorted in a charge sharing area where the load signal TP is at a high level and opened in a driving area where the load signal TP is at a low level.

Figure 6:
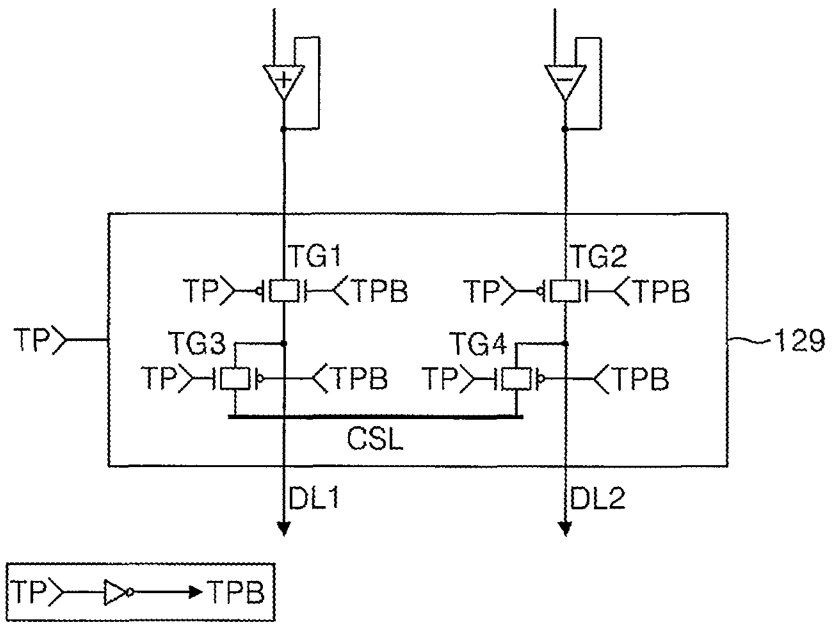
FIG. 6 is another exemplary circuit diagram of the switching unit shown in FIG. 3.

FIG. 6 is another exemplary circuit diagram of the switching unit shown in FIG. 3, in which a switch unit 129 corresponding to one data line DL1 supplied with a positive gradation voltage and one data line DL2 supplied with a negative gradation voltage is shown. As shown in the figure, an output switch OSW and a charge sharing switch CSW of the switch unit 129 consist of transfer gates TG1 to TG4 including PMOS and NMOS transistors.

The transfer gates TG1 and TG2 constituting the output switch OSW, a source of the PMOS transistor and a drain of the NMOS transistor are commonly connected to an output terminal of an amplifier, a drain of the PMOS transistor and a source of the NMOS transistor are commonly connected to a data line. A load signal TP is applied to a gate of the PMOS transistor and a load bar signal TPB is applied to a gate of the NMOS transistor. The load bar signal TPB is a signal having a phase inverse to that of the load signal TP.

Accordingly, the output switch OSW is opened where the load signal TP is at a high level and shorted where the load signal TP is at a low level.

The transfer gates TG3 and TG4 constituting the charge sharing switch CSW, a source of the PMOS transistor and a drain of the NMOS transistor are commonly connected to a data line, a drain of the PMOS transistor and a source of the NMOS transistor are commonly connected to a charge sharing line CSL. A load bar signal TPB is applied to a gate of the PMOS transistor, and a load signal TP is applied to a gate of the NMOS transistor.

Accordingly, the charge sharing switch CSW is shorted where the load signal TP is at a high level and opened where the load signal TP is at a low level.

Figure 7:
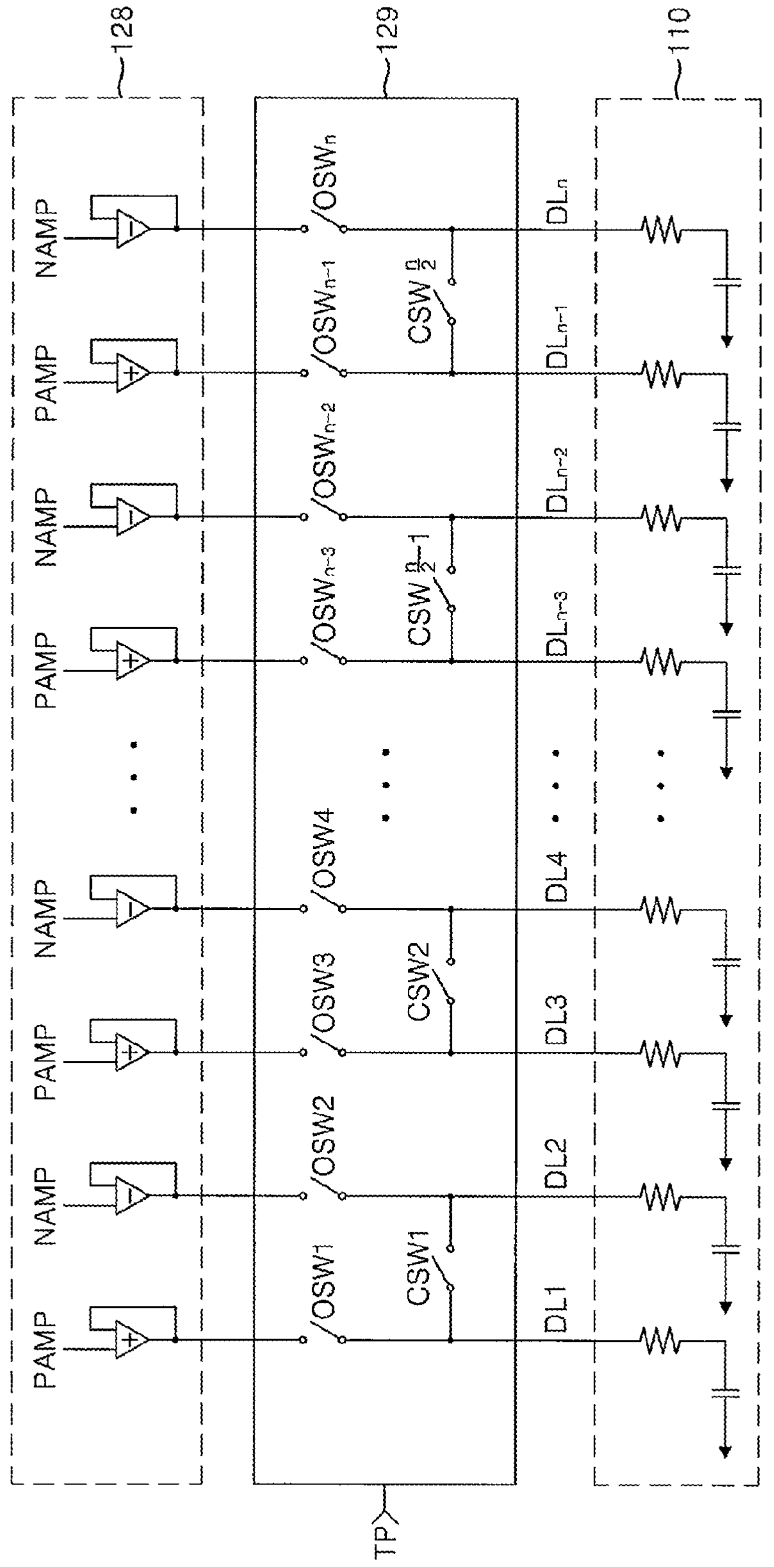
FIG. 7 is another conceptual diagram of the switching unit shown in FIG. 2.

FIG. 7 is another conceptual diagram of the switching unit shown in FIG. 2. As shown in the figure, charge sharing switches CSW1 to CSWn/2 of the switch unit are provided between data lines DL1, DL3, . . . , and DLn−1 supplied with a positive gradation voltage and data lines DL2, DL4, . . . , and DLn supplied with a negative gradation voltage. Each of the plurality of data line pairs DL1:DL2, DL3:DL4, . . . , and DLn−1:DLn shares one of the charge sharing switches CSW1 to CSWn/2 provided between the plurality of data line pairs and may be directly connected via the charge sharing switches CSW1 to CSWn/2 without a separate charge sharing line.

The charge sharing switches CSW1 to CSWn/2 are provided between the data lines DL1, DL3, . . . , and DLn−1 connected to positive amplifiers PAMP and the data lines DL2, DL4, . . . , and DLn connected to negative amplifiers NAMP to directly switch the electrical connection of the data line pairs DL1:DL2, DL3:DL4, . . . , and DLn−1:DLn, respectively.

Namely, the switch unit 129 of the present embodiment includes one of the charge sharing switches CSW1 to CSWn/2 in the unit of a pair of data lines DL1:DL2, DL3:DL4, . . . , and DLn−1:DLn. In this case, each of the data line pairs DL1:DL2, DL3:DL4, . . . , and DLn−1:DLn corresponds to the data line connected to the positive amplifier PAMP and the data line connected to the negative amplifier NAMP.

The switch unit 129 opens the output switches OSW1 to OSWn in response to a load signal TP and performs charge sharing in the unit of a pair of the data lines DL1:DL2, DL3:DL4, . . . , and DLn−1:DLn by shorting the charge sharing switches CSW1 to CSWn/2. Since the other elements and operations can be readily understood to those skilled in the art through the former description with reference to FIG. 3, their detailed description will be omitted.

Figure 8:
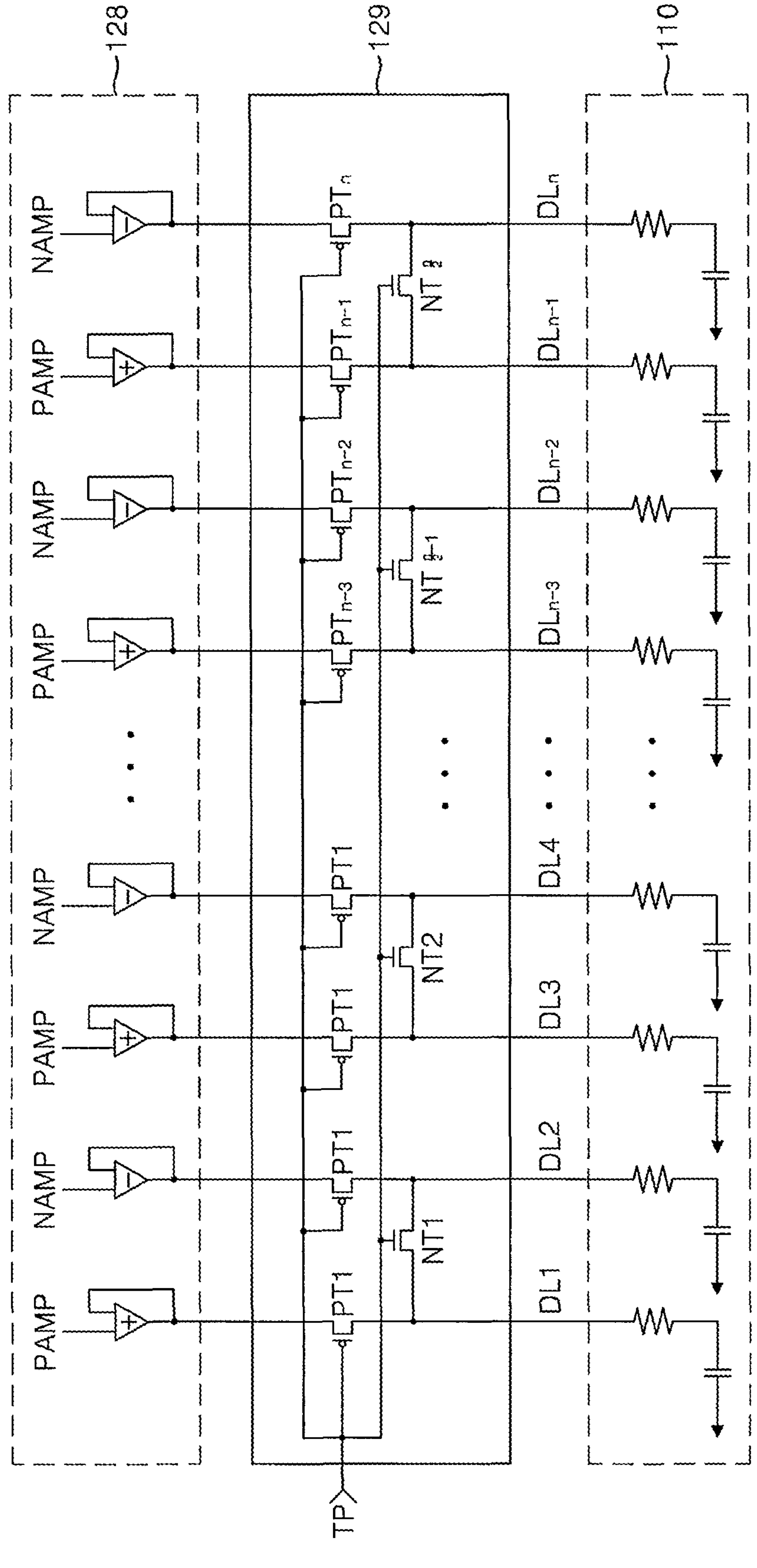
FIG. 8 is an exemplary circuit diagram of the switching unit shown in FIG. 7.

FIG. 8 is an exemplary circuit diagram of the switching unit shown in FIG. 7. As shown in the figure, the switch unit 129 includes an output switch OSW including PMOS transistors PT1 to PTn and a charge sharing switch CSW including NMOS transistors NT1 to NTn/2.

Each of the NMOS transistors NT1 to NTn/2 constituting the charge sharing switch CSW includes a drain connected to the data line DL1, DL3, . . . , and DLn−1 supplied with a positive gradation voltage, a source connected to the data line DL2, DL4, . . . , and DLn supplied with a negative gradation voltage, and a gate supplied with a load signal TP. The charge sharing switch CSW is shorted where the load signal TP is at a high level and opened where the load signal TP is at a high level. Accordingly, the charge sharing switch CSW performs charge sharing by connecting the data line DL1, DL3, . . . , and DLn−1 supplied with the positive gradation voltage to the data line DL2, DL4, . . . , and DLn supplied with the negative gradation voltage.

Since the switch unit 129 of the present embodiment is configured to directly switch the connection between the data line DL1, DL3, . . . , and DLn−1 supplied with the positive gradation voltage and the data line DL2, DL4, . . . , and DLn supplied with the negative gradation voltage, the present invention has advantages in that the number NMOS transistors can be reduced and a separate charge sharing line is not required.

Figure 9:
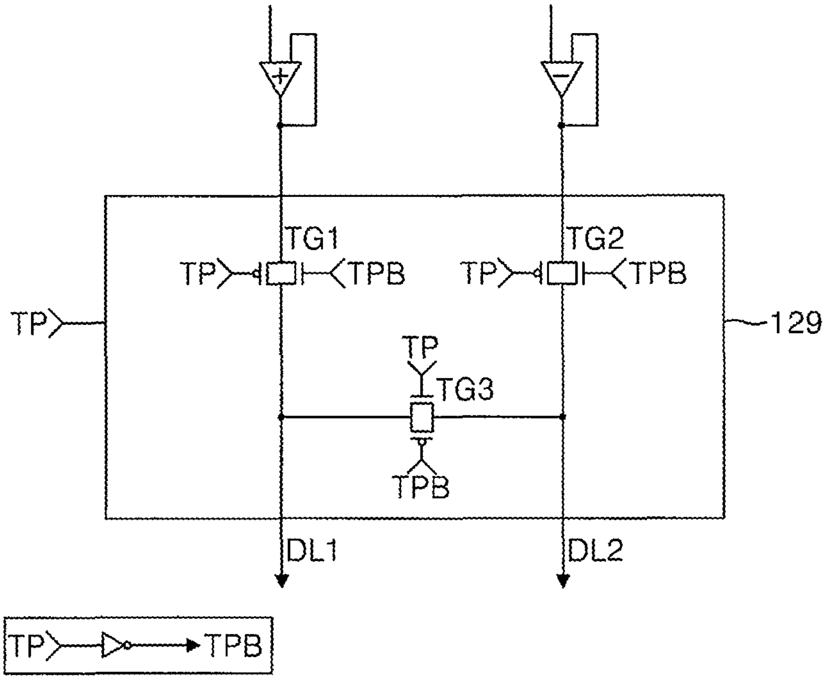
FIG. 9 is another exemplary circuit diagram of the switching unit shown in FIG. 7.

FIG. 9 is another exemplary circuit diagram of the switching unit shown in FIG. 7, in which a switch unit 129 corresponding to one data line supplied with a positive gradation voltage and one data line supplied with a negative gradation voltage is shown. As show in the figure, an output switch OSW and a charge sharing switch CSW of the switch unit 129 consist of transfer gates TG1 to TG3 including PMOS and NMOS transistors.

The transfer gate TG1 constituting the output switch OSW, a source of the PMOS transistor and a drain of the NMOS transistor are commonly connected to the data line DL1 supplied with a positive gradation voltage, a drain of the PMOS transistor and a source of the NMOS transistor are commonly connected to the data line DL2 supplied with a negative gradation voltage. A load bar signal TPB is applied to a gate of the PMOS transistor, and a load signal TP is applied to a gate of the NMOS transistor.

The charge sharing switch CSW is opened where the load signal TP is at a low level and shorted where the load signal TP is at a high level. Accordingly, the charge sharing switch CSW electrically connects the data line DL1 supplied with the positive gradation voltage in the charge sharing area to the data line DL2 supplied with the negative gradation voltage to perform the charge sharing.

Since output switch OSW is the same as that of FIG. 6, a detailed description will be omitted.

Figure 10:
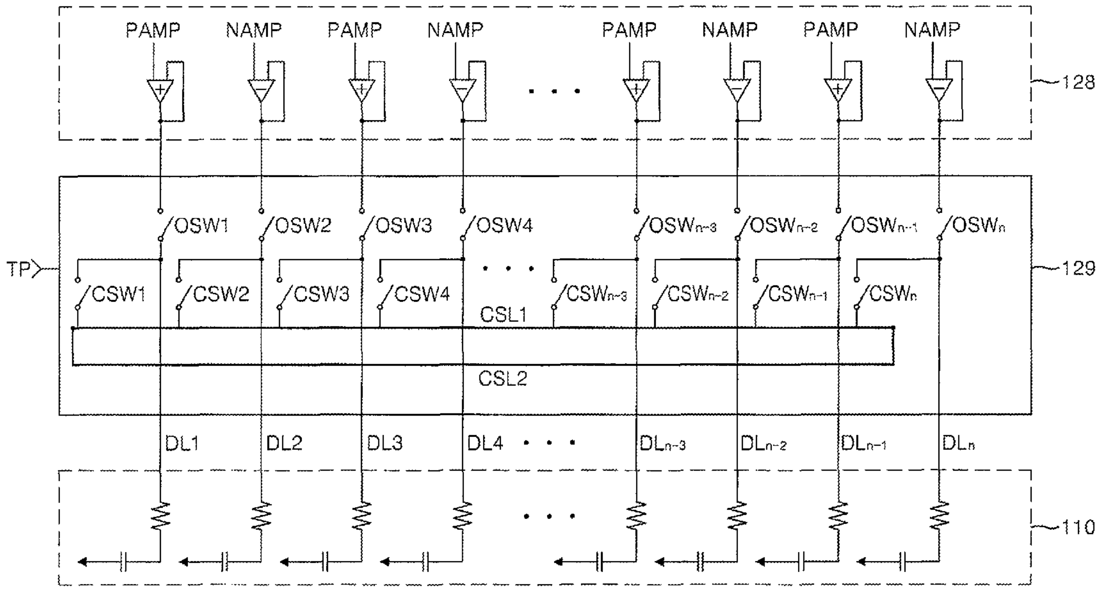
FIG. 10 is a conceptual diagram of a switching unit of an LCD device according to another exemplary embodiment of the present invention.

FIG. 10 is a conceptual diagram of a switching unit of an LCD device according to another embodiment of the present invention. As shown in the figure, a switch unit 129 includes a plurality of output switches OSW1 to OSWn, a plurality of charge sharing switches CSW1 to CSWn, a first charge sharing line CSL1, and a second charge sharing line CSL2.

The charge sharing switches CSW1 to CSWn are provided between the respective data lines DL1 to DLn and the first charge sharing line CSL1, and switch electrical connections between the data lines DL1 to DLn and the first charge sharing line CSL1. The charge sharing switches CSW1 and CSWn provided on the first and last data lines DL1 and DLn are connected to the second charge sharing line CSL2 to simultaneously perform a function of switching the electrical connections of the first and last data lines DL1 and DLn, respectively.

The first charge sharing line CSL1 electrically connects the data lines DL1, DL3, . . . , and DLn−1 connected to a plurality of positive amplifiers PAMP to the data lines DL2, DL4, . . . , and DLn connected to a plurality of negative amplifiers NAMP, so that electric charges of the plurality of data lines DL1 to DLn are shared. In other words, the switch unit 129 of the present embodiment is configured to enable the plurality of data lines DL1 to DLn to share the first charge sharing line CSL1.

The second charge sharing line CSL2 is a charge sharing line to enable the data line DL1 connected to the first amplifier and the data line DLn connected to the last amplifier to share electric charges. In this case, the first amplifier provides a positive gradation voltage and the last amplifier provides a negative gradation voltage.

The switch unit 129 of the LCD device according to another embodiment of the present invention is configured to perform charge sharing for the plurality of data lines DL1 to DLn via the first charge sharing line CSL1 and for the first and last data lines DL1 and DLn via the second charge sharing line.

Accordingly, the LCD device according to another embodiment of the present invention can solve the problem of the irregular charge sharing occurring in the first and last data lines in the related art data driving integrated circuit and eliminate the vertical line defect caused by the irregular charge sharing.

As described above, since the data driver and the LCD device using the same in accordance with the present invention perform a charge sharing function for data lines connected to first and last channels of a data driving integrated circuit it is possible to eliminate the vertical line defect caused by the irregular charge sharing in the related art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data driving apparatus for a liquid crystal display device, comprising:
  - a plurality of output switches switching electrical connections between a plurality of amplifiers for providing a gradation voltage and a plurality of data lines corresponding to the amplifiers and provided with the gradation voltage, respectively;
  - a first charge sharing line sharing electric charges of the plurality of data lines;
  - a second charge sharing line sharing electric charges between first and last data lines connected to first and last amplifiers in the plurality of amplifiers; and
  - a plurality of charge sharing switches switching electrical connections between the first charge sharing line and the plurality of data lines,
  - wherein first and last charge sharing switches in the plurality of charge sharing switches switch electrical connections between the first data line and the second charge sharing line and between the last data line and the second charge sharing line in response to a control signal, and wherein the first charge sharing line and the second charge sharing line are electrically connected in parallel between the first and last charge sharing switches.

2. The apparatus of claim 1, wherein the plurality of amplifiers comprise a first amplifier providing a positive gradation voltage and a second amplifier corresponding to the first amplifier to provide a negative gradation voltage, in which one of the first and last amplifiers operates as the first amplifier and the other amplifier operates as the second amplifier.

3. The apparatus of claim 2, wherein the control signal comprises a load signal enabling the first amplifier to provide the positive gradation voltage to the data line corresponding to the first amplifier and the second amplifier to provide the negative gradation voltage to the data line corresponding to the second amplifier.

4. The apparatus of claim 3, wherein the output switch is opened in an enable state of the control signal, and the charge sharing switch is shorted in the enabled state of the control signal, thereby sharing the electric charges of the plurality of data lines through the charge sharing line.

5. A liquid crystal display device, comprising:
  - a liquid crystal display panel displaying data by a gradation voltage provided in response to a gate driving signal;
  - a data driving unit generating the gradation voltage based on a gamma voltage and providing the same to the liquid crystal display panel in response to a data control signal, the data driving unit comprising a plurality of data driving integrated circuits;
  - a gate driving unit providing the gate driving signal to the liquid crystal display panel in response to a gate control signal; and
  - a timing controller providing the data control signal and the gate control signal, wherein each of the plurality of data driving integrated circuits comprises a plurality of output switches switching electrical connections between a plurality of amplifiers for providing a gradation voltage and a plurality of data lines corresponding to the amplifiers and provided with the gradation voltage, respectively, a first charge sharing line sharing electric charges of the plurality of data lines, a second charge sharing line sharing electric charges between first and last data lines connected to first and last amplifiers in the plurality of amplifiers, and a plurality of charge sharing switches switching electrical connections between the first charge sharing line and the plurality of data lines, wherein first and last charge sharing switches in the plurality of charge sharing switches switch electrical connections between the first data line and the second charge sharing line and between the last data line and the second charge sharing line in response to a control signal, and wherein the first charge sharing line and the second charge sharing line are electrically connected in parallel between the first and last charge sharing switches.

6. The liquid crystal display device of claim 5, wherein the plurality of amplifiers comprise a first amplifier providing a positive gradation voltage and a second amplifier corresponding to the first amplifier to provide a negative gradation voltage, in which one of the first and last amplifiers operates as the first amplifier and the other amplifier operates as the second amplifier.

7. The liquid crystal display device of claim 6, wherein the control signal comprises a load signal enabling the first amplifier to provide the positive gradation voltage to the data line corresponding to the first amplifier and the second amplifier to provide the negative gradation voltage to the data line corresponding to the second amplifier.

8. The liquid crystal display de vice of claim 7, wherein the output switch is opened in an enable state of the control signal, and the charge sharing switch is shorted in the enabled state of the control signal, thereby sharing the electric charges of the plurality of data lines through the charge sharing line.

* * * * *